(No Model.)
J. WILKINS.
Amalgamator.
No. 240,213.
Patented April 12, 1881.
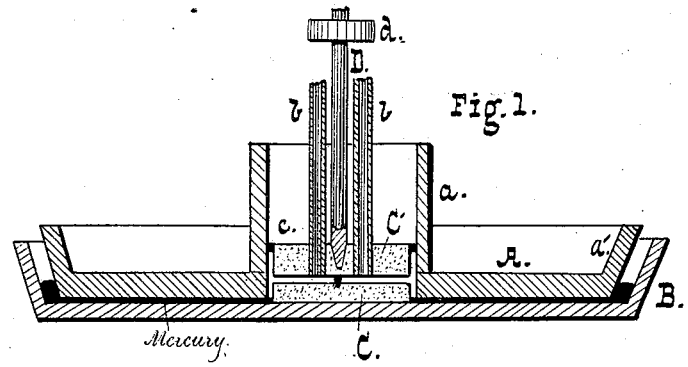
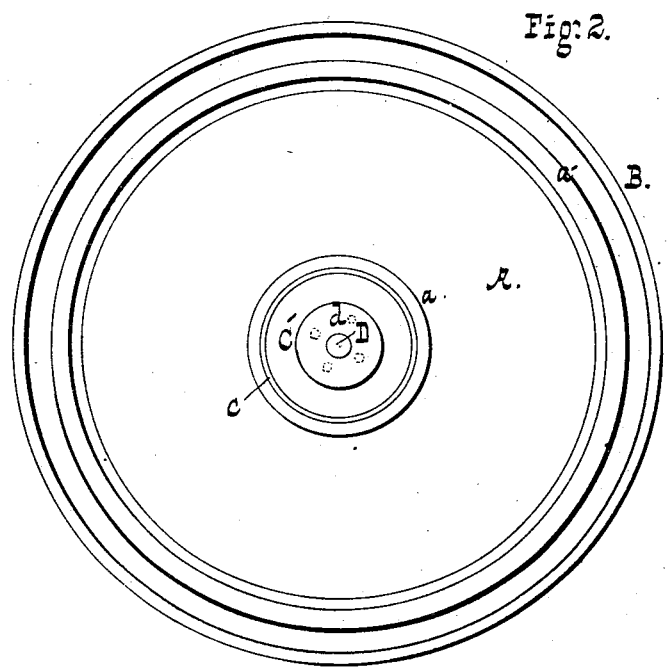
Witnesses,
W. A. Bertram.
Cell. Armstrong.
Inventor,
Jos. Wilkins.
by
R. D. Williams,
Attorney.

UNITED STATES PATENT OFFICE.

JOSEPH WILKINS, OF BALTIMORE, MARYLAND.

AMALGAMATOR.

SPECIFICATION forming part of Letters Patent No. 240,213, dated April 12, 1881.

Application filed December 23, 1880. (No model.)

*To all whom it may concern:*

Be it known that I, JOSEPH WILKINS, of Baltimore city, State of Maryland, have invented certain new and useful Improvements in Amalgamators; and I hereby declare the ssme to be fully, clearly, and exactly described as follows, reference being had to the accompanying drawings, in which—

Figure 1 is a central vertical sectional view, and Fig. 2 is a plan view, of the device.

My present invention relates to devices for separating noble metals from their ores by amalgamation; and it consists in certain improvements upon those for which Letters Patent were granted me February 10, 1880, and August 17, 1880, and numbered, respectively, 224,368 and 231,205. The devices forming the subject of the said Letters Patent are designed to separate what is technically known as "float-gold" from the auriferous water which flows from the stamp-mill, the grosser impurities being first allowed to subside; and this I accomplish by causing the water to flow between a horizontal disk and a bath of mercury, the latter forming an amalgam with and retaining the gold.

Much loss has heretofore resulted in treating gold ores by amalgamation from the fact that the gold is in great part superficially coated with a rust or film of oxide of iron, which prevents, in whole or in part, the attack of the mercury. This is especially true of the gold ores of the Atlantic-coast States, in which the gold is generally found associated with pyrites.

The object of my invention is to mechanically remove this protecting film of oxide preparatory to passing the ore through the amalgamator, and this I effect by the use of the apparatus shown in the annexed drawings, and in which—

A is a disk having a circumferential flange, $a'$, and B is a pan for containing a bath of mercury. The lower face of the disk is covered with amalgamated sheet metal. The construction and operation of these parts are identically those described in my before-mentioned patents.

The center of the disk is cut away, and around the central opening is a rim or wall, $a$.

C is a stone or equivalent grinding-disk secured to the pan, and C' is the upper disk, which is mounted within the wall $a$, and, by preference, is rigidly secured thereto, a washer or packing, $c$, being interposed.

D is the spindle, having driving-pulley $d$, and $b\ b$ are the pipes for the entrance of the ore or auriferous water.

In operation, the upper stone and pan being caused to revolve, the material to be treated is led down through the pipes $b$ and passes between the grinding-disks, which mechanically scrub the gold and remove any oxide or other protecting material from its surface. The ore passes, by its weight, down pipes $b\ b$, and next descends and passes between the disk and pan, and finds exit finally through a suitable spout in the latter. In transit between the disk and pan it is subjected to the amalgamating action of the mercury and the gold is retained in the bath. From time to time the mercury is drawn off, squeezed through a cloth, and the pasty amalgam which remains in the cloth is subjected to distillation, as usual.

It is not essential, and, indeed, in treating float gold, not desirable, that the disk A should turn. So I provide the rim $a$, which is of a sufficient height to secure a hydraulic head, which will insure a displacement of the mercury to enable the water to pass between the disk and pan.

If desired, the disk may be provided with radial ribs to facilitate the passage of the ore between it and the pan.

As an obvious alternative for the described construction, the lower stone and pan may be made to revolve while the upper stone and disk remain stationary, the gist of my invention consisting in an apparatus for mechanically scouring the gold before passing it through the amalgamator.

I am aware that heretofore auriferous ores have been subjected to the grinding action of burrs both before and pending amalgamation, and such I do not claim.

What I claim is—

In combination with the pan having a burr, C, the plane-faced disk A, having a burr, C', peripheral flange $a'$, and wall $a$, the pipes $b$ and driving-shaft D, as set forth.

JOS. WILKINS.

Witnesses:
R. D. WILLIAMS,
W. A. BERTRAM.